Sept. 25, 1923.
E. TELLESON
WHEEL MOUNT
Filed April 26, 1919
1,468,680
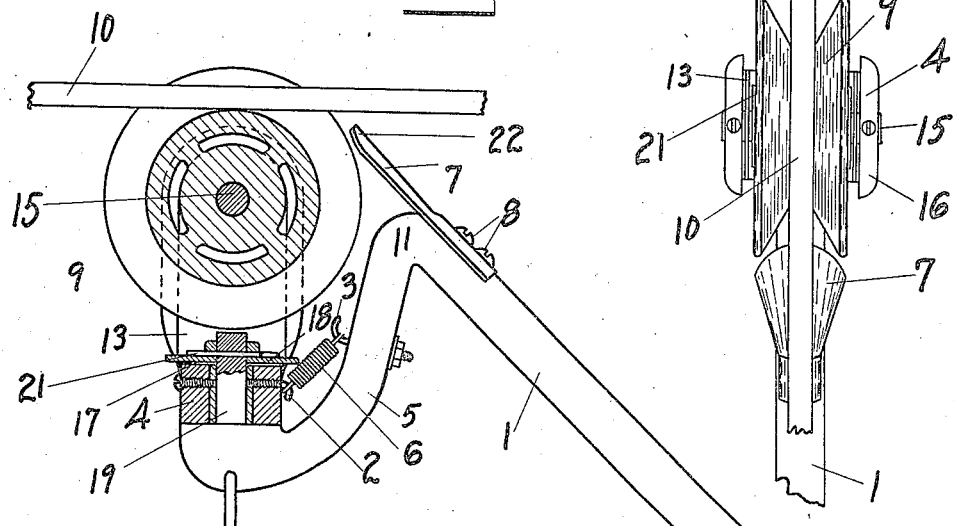
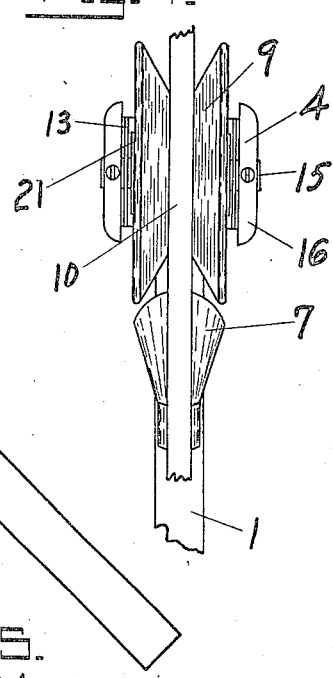
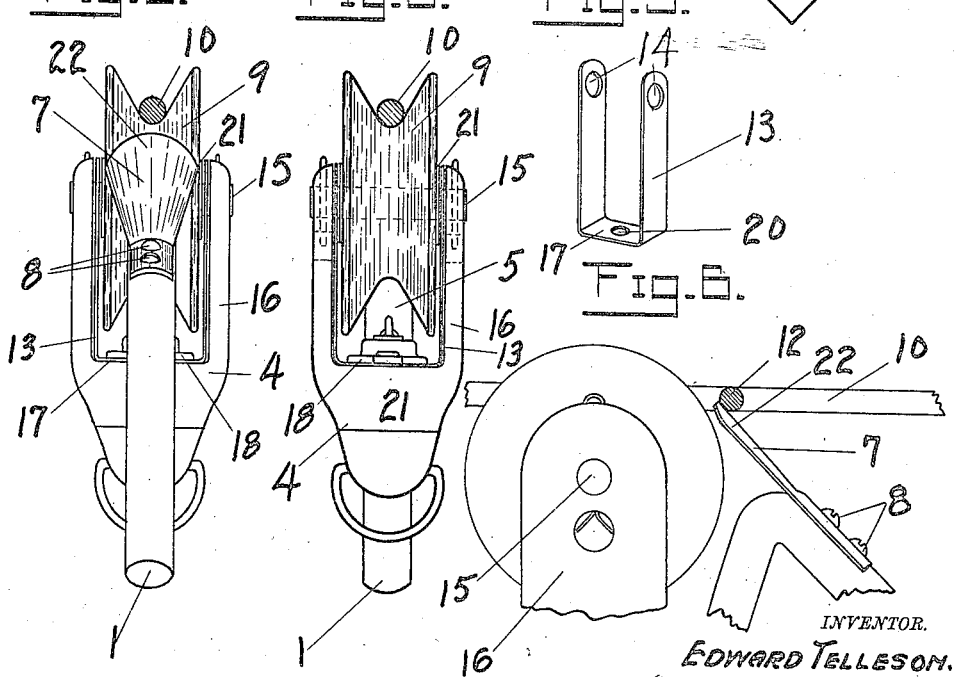
INVENTOR.
EDWARD TELLESON.
BY Adam E Fisher
ATTORNEY.

Patented Sept. 25, 1923.

1,468,680

UNITED STATES PATENT OFFICE.

EDWARD TELLESON, OF BINGHAMTON, NEW YORK.

WHEEL MOUNT.

Application filed April 26, 1919. Serial No. 292,856.

*To all whom it may concern:*

Be it known that I, EDWARD TELLESON, a citizen of the United States, residing in the city of Binghamton, county of Broome, and State of New York, have invented new and useful Improvements in Wheel Mounts, of which the following is a specification, reference being had to the accompanying drawings.

The present invention relates to improvements on wheel mounts for trolley heads, and is an improvement upon my invention patented to me under date of June 2, 1914, by Patent Number 1,098,464. That patent covers a removable and rotatable trolley head. It is the purpose of this invention to supply specific resilient means for maintaining the trolley wheel in normal parallelism with the trolley wire, while at the same time permitting the trolley wheel to rotate slightly either to the right or left when rounding curves.

It is a further purpose to provide a U-shaped metallic spring member or conductor interposed over the wheel axle or shaft, and pressing against and extended between the ends of the hub of the wheel and the trolley head proper, as a means for more positively conveying the electric current.

It is a further purpose of the invention to provide a tongue extended from the trolley pole upwardly over the trolley wheel and projected toward the trolley wire as means for both preventing the crosspole wires from becoming locked in front of the trolley head when the latter accidentally leaves the trolley wire.

In the drawings—

Fig. 1 is a sectional side elevation showing my improvements;

Fig. 2, a rear elevation of the same;

Fig. 3, a front elevation;

Fig. 4, a top plan view;

Fig. 5, a perspective detail of the U-shaped metallic spring member;

Fig. 6 is a detail showing how the tongue element of the device operates to prevent crosspole wires from catching in front of the trolley wheel.

Referring more particularly to the drawings, in connection with the rotatable trolley head 4 described and claimed in my aforesaid patent, I provide a hook 2 at the forward side thereof, which may be bolted, soldered, or otherwise rigidly secured in place, and a complementary hook 3 similarly secured at the rear side of the goose-neck shaped end 5 of the trolley pole 1. Between the two hooks 2 and 3, I mount the retractile coil spring 6, so tensioned as to normally hold the said rotatable trolley head 4 in a straightaway forward position, and so that the plane of the trolley wheel 9 will normally stand in parallelism with the trolley wire 10. At the top of the upper elbow 11 of the goose-neck shaped end 5, I rigidly mount the metallic tongue 7 by means of screws, such as 8, or otherwise. This tongue 7 projects upwardly and backwardly, so as to overhang the periphery of the trolley wheel 9 immediately below the trolley wire 10, and the tongue 7 is convexed outwardly as shown at 22, so as to facilitate its function, which is to prevent the cross wire 12 from being caught, should the trolley wheel 9 leave the trolley wire 10. In such event, the convexed end 22 of the tongue 7 would catch the crosspole wire 12 upon the upward movement of the trolley wheel 9, and would prevent the said crosspole wire from becoming engaged between the trolley wheel 9 and the elbow 11, and so that the entire apparatus would be free for pulling downward and resetting upon the trolley wire 10 in usual manner.

I further provide a flat U-shaped metallic spring member 13, which is made of flat spring metal and is provided with oppositely positioned shaft holes 14, one at the upper end of each of the arms of said member 13, through which the axle or shaft 15 is passed when the trolley wheel 9 is mounted in position. This U-shaped member 13 follows in general the inner contour of the fork 16 within which the trolley wheel is mounted in usual manner, and the foot 17 of this U-shaped member passes underneath the washer 18 and is secured in place by the shank 19, which passes upwardly from the base of the trolley head 4 through the hole 20 formed through the foot 17 of the U-shaped member. A cotter pin 21 passes through the washer 18 and the shank 19, and locks the U-shaped member in place as well as securing the trolley head 4 in rotatable position. This method of mounting the trolley head 4 in connection with the end of the trolley pole is described in my aforesaid patent, and nothing new is claimed herein over said patent in respect of the general method of mounting.

The improvements claimed relate to the

U-shaped member 13, the retractile spring 6 and its mounting, the goose neck 5 at the upper end of the trolley pole 1, and the projecting tongue 7. The upper arms of the U-shaped metallic spring member 13 are adapted to set closely and snugly against the outer ends 21 of the hub of the trolley wheel 9, and the foot of the same U-shaped member being in snug contact with the trolley head 4, an additional and positive means for conveying the electric current from the trolley wire through the trolley wheel and trolley pole is thus provided.

In constant use, the bearings and the ends of the hub of the trolley wheel would become worn so that gaps would be created between the ends 21 of the hub of the trolley wheel, and the arms of the fork 16, thus interrupting to an extent the passage of the electric current, and thus said U-shaped metallic spring member affords at all times a remedy for this difficulty, and maintains a positive contact between the trolley wheel and the trolley head for the passage of the electric current. The goose-neck shape of the upper end of the trolley pole facilitates the proper mounting of the wheel and tongue for the purposes of the invention.

In operation, the spring 6 normally holds the trolley wheel 9 in straight-away position, at the same time permitting it to deflect to either side in rounding curves. The tongue 7 prevents the locking of the crosspole wires 12 in front of the trolley wheel 9 in case of displacement of the trolley wheel from the trolley wire 10, while the U-shaped metallic spring member 13 facilitates the passage of the electric current from the trolley wire to and through the trolley pole.

While I have herein described a certain specific manner and method of constructing and assembling the elements of my invention, it is understood that I may vary from the same in minor details, not departing from the spirit of my invention, so as best to construct a practical device for the purpose intended, as defined in the appended claim.

What I claim to be new and patentable is:

The combination with an ordinary trolley head, wheel, and wire, of a trolley pole having a goose neck at its upper end; and a straight tongue secured to the upper bend of the goose neck and extended upwardly and backwardly adjacent the trolley wire and wheel, as means for preventing cross wires becoming caught in front of the trolley wheel.

EDWARD TELLESON.

Witnesses:
JOSEPH P. MORGAN,
M. R. ILIFF.